US010522143B2

(12) United States Patent
Chandrasekaran et al.

(10) Patent No.: US 10,522,143 B2
(45) Date of Patent: Dec. 31, 2019

(54) EMPATHETIC PERSONAL VIRTUAL DIGITAL ASSISTANT

(71) Applicant: Microsoft Technology Licensing, LLC, Redmond, WA (US)

(72) Inventors: Nirupama Chandrasekaran, Redmond, WA (US); Robert A Sim, Bellevue, WA (US); Ryen W. White, Redmond, WA (US); Nikrouz Ghotbi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/906,804

(22) Filed: Feb. 27, 2018

(65) Prior Publication Data

US 2019/0266999 A1    Aug. 29, 2019

(51) Int. Cl.
*G10L 15/22* (2006.01)
*G10L 15/06* (2013.01)
(Continued)

(52) U.S. Cl.
CPC .......... *G10L 15/22* (2013.01); *G06K 9/00315* (2013.01); *G09B 5/00* (2013.01); *G09B 5/06* (2013.01); *G09B 7/02* (2013.01); *G09B 19/00* (2013.01); *G10L 13/033* (2013.01); *G10L 15/063* (2013.01); *G10L 15/16* (2013.01); *G10L 25/63* (2013.01); *G10L 2015/226* (2013.01)

(58) Field of Classification Search
CPC ......... G10L 15/22; G10L 15/16; G10L 25/63; G10L 25/30; G10L 13/00; G10L 2015/223; G10L 2015/227; G10L 13/033; G10L 15/063; G10L 15/14; G10L 15/20; G10L 2015/226; G06K 9/00302; G06K 9/00288; G06K 9/00315; G06K 9/00268; G06K 9/00248; G06K 9/00597; G06K 9/66; G06K 9/6842; G06K 9/00335
See application file for complete search history.

(56) References Cited

U.S. PATENT DOCUMENTS 10,178,218 B1 * 1/2019 Vadodaria ............. H04L 51/063
2016/0063874 A1   3/2016 Czerwinski et al.
2017/0160813 A1 * 6/2017 Divakaran ............. G06F 3/017

OTHER PUBLICATIONS

Hurter, et al., "Cardiolens: Remote Physiological Monitoring in a Mixed Reality Environment", In Proceedings of the SIGGRAPH Emerging Technologies, Jul. 30, 2017, 2 Pages.

(Continued)

*Primary Examiner* — Yogeshkumar Patel
(74) *Attorney, Agent, or Firm* — Jeffrey L. Ranck; Ranck IP Law

(57) ABSTRACT

A Personal Virtual Assistant (PVA) system takes existing inputs and processes them to understand the user's personality, intent, etc., through analysis of features such as the user's tone, language use, vocal volume, facial expressions, and context from device use and surroundings. As a result of the processing, the PVA system augments how it responds and interacts with the user. Such augmented responses may include simple things like changing the assistant's tone to complimenting the user's mood, as well as changing her use of language, volume, and the way she shares information, like giving good news when the user might be down, or suppressing bad news when the time is not right for the user to optimally process it.

29 Claims, 7 Drawing Sheets

(51) Int. Cl.
*G10L 25/63*   (2013.01)
*G10L 15/16*   (2006.01)
*G06K 9/00*    (2006.01)
*G10L 13/033*  (2013.01)
*G09B 19/00*   (2006.01)
*G09B 7/02*    (2006.01)
*G09B 5/06*    (2006.01)
*G09B 5/00*    (2006.01)

(56) References Cited

OTHER PUBLICATIONS

Russell, James A., "A Circumplex Model of Affect", In Journal of Personality and Social Psychology, vol. 39, Issue 6, Dec. 1980, pp. 1161-1178.

"International Search Report and Written Opinion Issued in PCT Application No. PCT/US2019/018658", dated Apr. 18, 2019, 13 Pages.

* cited by examiner

EMPATHETIC PERSONAL VIRTUAL DIGITAL ASSISTANT

BACKGROUND

Interaction with Personal Virtual Assistants (PVAs) is becoming part of everyday life through ambient devices in our homes, at the work place, and on the go through mobile phones, wearables, etc. Currently, most interactions with PVAs are in the form of asking questions and receiving simple answers. As we move beyond the question and answer type of engagement to more back and forth conversations mimicking a human assistant, it becomes important for PVAs to show empathy during the engagement.

Generally speaking, PVAs' responses and interactions tend to be robotic, mono-tonal, and impersonal and sometimes insensitive. As a result, user engagement suffers. An empathetic response from a PVA (personalized for the user based on previous interactions) will drive outcomes such as more engaging interactions, increased user satisfaction, and increased usage.

SUMMARY

Various details for the embodiments of the inventive subject matter are provided in the accompanying drawings and in the detailed description text below. It will be understood that the following section provides summarized examples of some of these embodiments.

To have empathy, the PVA described herein, in addition to understanding the context and user's general interests, learns from previous interactions with the particular user and the user's reaction to its responses by training a machine learning model. For this purpose, multi-modal sensing (including audio-tone and video-facial expression) is used to evaluate the user's reaction to learn and improve future responses.

To understand the context, the PVA also takes existing inputs and processes them to understand the user's personality, intent, etc., through analysis of features such as the user's tone, language use, vocal volume, facial expressions, and context from device use and surroundings. As a result of the processing, the PVA augments how it responds to and interacts with the user. Such augmented responses may include simple things like changing the assistant's tone to match or complement the user's mood, as well as changing her use of language, volume, and the way she shares information, like giving good news when the user might be down, or suppressing bad news when the time is not right for the user to optimally process it. The system can learn which situations and emotional responses resonate with users and can generate a store comprising records such as tuples including, for example, {situation, system emotion response, user reaction}. This data can be used to train machine learning algorithms to learn the mapping between a situation and the most appropriate emotional reaction for the user, for the current cohort of users, or for the entire population of users.

Embodiments described herein generally relate to a personal virtual assistant system, comprising processing circuitry, a speaker, at least one sensing device that collects user state information relating to an emotional state of a user from at least the user's voice, and a memory device having instructions stored therein. The instructions, when executed by the processing circuitry, configure the processing circuitry to receive a communication from the user that elicits a response from the personal virtual assistant system; determine from at least the user state information collected by the at least one sensing device an emotional state of the user using a machine learning model; generate a response that takes into account the determined emotional state of the user; output the generated response to the user using language, volume, and tone over the speaker selected to change the determined emotional state of the user to improved different emotional state; and train the machine learning model based on the user's response to the outputted response. The personal virtual assistant may be implemented as a hardware device comprising a housing for the processing circuitry, speaker, at least one sensing device, and memory device or may be implemented on a more generic software platform like Cortana™ on Windows OS™ available from Microsoft Corporation (which may involve a number of cloud components), or a combination of the hardware device and software platform.

In sample embodiments, the at least one sensing device senses the user's tone of voice and language used in communicating with the personal virtual assistant system and may further sense the user's facial expression to extract user state information relating to the emotional state of the user from the user's facial expression. The at least one sensing device may further sense the user's context from at least one of the user's location, local time, schedule, and surroundings and the user's prior interactions with the personal virtual assistant system or other devices.

In other sample embodiments, the memory device further comprises instructions stored therein, which when executed by the processing circuitry, configure the processing circuitry to output the generated response to the user using language, volume, and tone that accounts for the determined emotional state of the user by modifying at least one of a speed, tone, and language in the response to the user. The personal virtual assistant system may also comprise a visual output device that provides at least one of modified visual colors and animations in the response to the user depending upon the determined emotional state of the user. The instructions when executed may also cause the processing circuitry to modify when and how the response is provided to the user based upon the user's determined emotional state at the time the response is to be provided.

The memory device may also store instructions that when executed cause the processing circuitry to receive user preferences data and cultural references data that the machine learning model uses with the user state information as current emotional state parameters from which to determine the emotional state of the user. The instructions may further cause the processing circuitry to process the user state information using artificial intelligence services to determine a user's current emotional state parameters. The processing circuitry may also apply heuristics to the user's response to the outputted response and the user's determined current emotional state parameters train the machine learning model.

The memory device may further comprise instructions stored therein, which when executed by the processing circuitry, configure the processing circuitry to generate a response that takes into account the determined emotional state of the user by varying the response based on rules or lookups stored in a lookup table. The processing circuitry may also process instructions to generate a response that takes into account the determined emotional state of the user by using a deep neural network to generate conversationally and emotionally appropriate responses having contextualized text and tone according to the determined emotional state of the user.

The memory device further comprises instructions stored therein, which when executed by the processing circuitry, configure the processing circuitry to provide feedback to the machine learning model to inform the machine learning model of the user's response to the outputted response and to update the machine learning model to reflect at least one of the user's response determined from the user state information and user feedback ratings. The processing circuitry may also execute instructions to train the machine learning model as to what attributes of the response provided to the user elicits a particular reaction from the user and to cause the machine learning model to generate responses expected to elicit the particular reaction from the user based on the emotional state of the user.

In order to address a cold start scenario, the memory device further includes instructions stored therein, which when executed by the processing circuitry, configure the processing circuitry to match the user against other users using demographic profiles, location, interests, etc. or a combination thereof and to provide additional data to the machine learning model from at least one of the other users having a demographic profile, location, interests, etc. similar to that of the user. The cold start could also use plain heuristics whereby with each usage the data is used to build and improve the machine learning (ML) mode.

In addition, the processing circuitry may execute instructions to determine what information may be shared with the user based on the determined emotional state of the user and what information may be shared with the user at a later time when the user is determined to be in a different emotional state. The processing circuitry may also execute instructions to learn a pattern of the emotional state of the user over time, to provide the pattern of the emotional state as input to the machine learning model, and to predict an emotional state of the user when a particular event or environmental condition is detected by the at least one sensing device.

The corresponding methods and computer readable media containing instructions for implementing such methods are also described herein.

Other embodiments described herein generally relate to a method comprising the steps of receiving communications from a user that elicit responses from a personal virtual assistant system; providing responses to the communications from the user; sensing at least the user's voice during at least one of the communications; collecting user state information relating to an emotional state of the user from at least the user's voice during the at least one of the communications; during the communications, determining from at least the collected user state information emotional states of the user using a machine learning model at different times during the communications; tracking an emotional state of the user during the communications using the user state information; and using a difference in emotional state during the communications as a label for at least one response to the communications provided to the user. The method thus tracks the user's emotional state over the course of an interaction with a personal virtual assistant system to learn how the user reacts to different responses. The corresponding systems and computer readable media containing instructions for implementing such methods are also describe herein.

As discussed herein, the logic, commands, or instructions that implement aspects of the electronic operations described above, may be provided in a local computing system or a remote computing system, including any number of form factors for the computing system such as desktop or notebook personal computers, mobile devices such as tablets, netbooks, and smartphones, client terminals and server-hosted machine instances, and the like. Another embodiment discussed herein includes the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described above, or other aspects depicted in the accompanying drawings and detailed description below.

This summary section is provided to introduce aspects of the inventive subject matter in a simplified form, with further explanation of the inventive subject matter following in the text of the detailed description. This summary section is not intended to identify essential or required features of the claimed subject matter, and the particular combination and order of elements listed this summary section is not intended to provide limitation to the elements of the claimed subject matter.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

A personal virtual assistant (PVA) is desired that differentiates and produces outputs that enable users to form deeper emotional connections because the PVA understands and reacts to their moods and helps them get into an optimal state. For example, conventional digital assistants may tell jokes and sometimes even use the language a user uses to communicate with him to augment their responses. However, no PVA exists that uses the breadth of input available across devices/services to proactively reach out to help the user improve his state of mind.

Microsoft Cognitive Services offer a range of discrete services that yield emotional context about a specific input. For instance, speech can be converted to text, and the text subsequently analyzed for sentiment. Image and video inputs can be analyzed to recognize users and determine their facial expressions, which may convey mood or emotional state. Recent research by McDuff et al, (Hurter and McDuff, "Cardiolens: Remote Physiological Monitoring in a Mixed Reality Environment," SIGGRAPH 2017 Talks, August 2017, Los Angeles, Calif.) shows that more detailed physiological measurements can be taken from video, determining user heart rate and breathing rate. Also, speech analysis can yield an estimate of a user's emotional state. These various sensing approaches, among others, represent potential building blocks for a system that can holistically determine a user's emotional state and augment its spoken responses and actions based on these inferences. Such a system is described herein.

Figure 1:
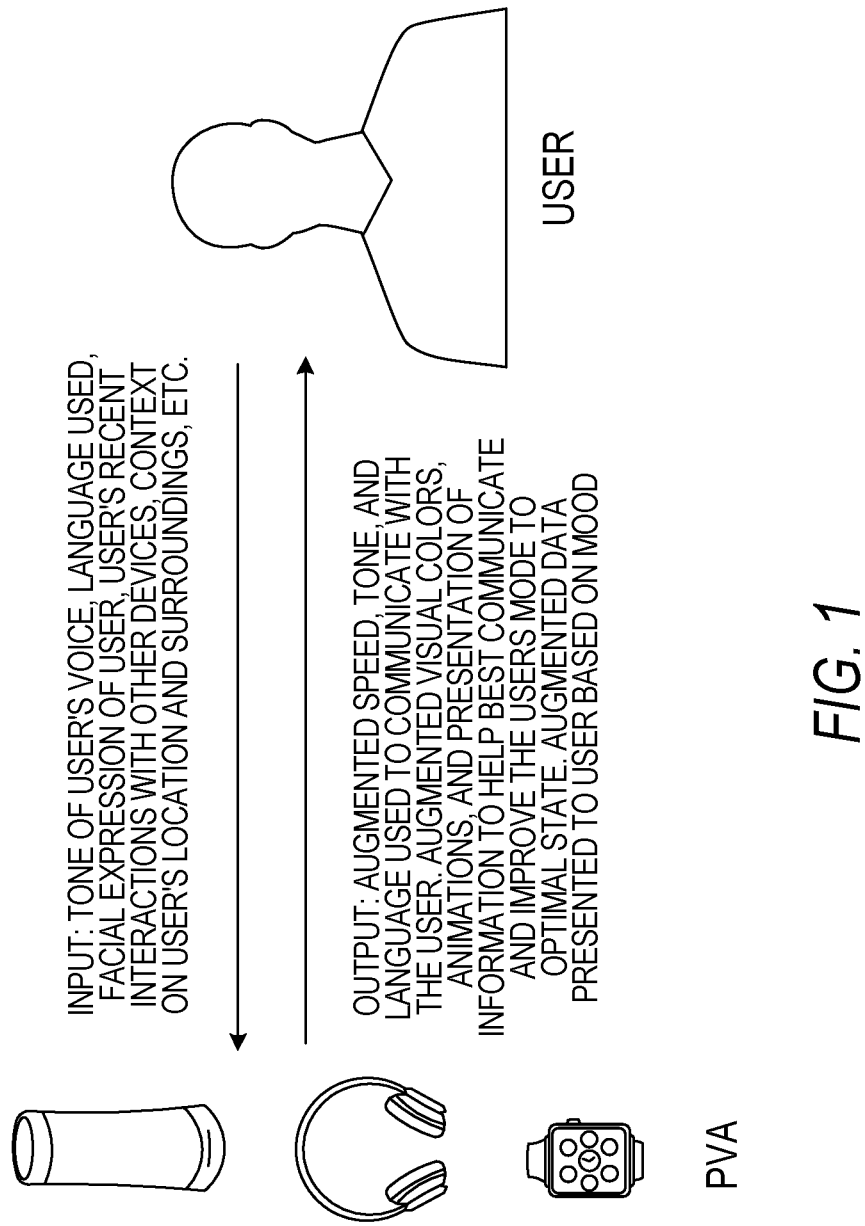
FIG. 1 generally illustrates a user's interaction with a personal virtual assistant according to an example described herein.

The following disclosure provides an overview of techniques and configurations to enable a PVA such as Cortana™ available from Microsoft Corporation to take inputs such as a user's tone of voice, language used, facial expression, recent interactions with other devices, context on the user's location, local time, schedule, surroundings, and the like and to process those inputs to provide outputs that have augmented speed, tone, and language for communication with the user. For example, as represented in FIG. 1, the outputs from the PVA may be augmented to adjust to the user's inferred emotional state or mood. Visual outputs from a visual output device of the PVA may also provide augmented visual colors, animations, and presentation of information that is determined to best communicate and improve the user's mood to an optimal state.

The system described herein personalizes the PVA's responses and adapts the responses over time based on the user's reactions. The system uses multi-modal sensing and a feedback loop to constantly adjust both the content and the delivery of the PVA's responses so that the responses are more empathetic and designed to improve the user's mood. For example, audio and video of the user's response is captured and processed with artificial intelligence (AI) services that infer the user's emotional state (happy/sad, energetic/lethargic, etc.). Additionally, input from wearables and the surrounding environment is also captured and processed to further assess the conditions under which the interaction with the user is taking place.

The system is created by starting with a model having inputs such as explicit settings by the user (likes/dislikes), culture, samples labelled by human judges, etc. In sample embodiments, these inputs could be used as ground truth labels to train the model. Features used in the model would be, for example, characteristics of a communication (e.g., joke) and characteristics of the user emotional state/situation at the time that the communication was requested and the response was provided. It will be appreciated that the elicited communication may be any communication elicited by a user, such as an interactive conversation with a user, an answer to a question, directions, a weather report, a joke, or any other type of audio, visual, and/or haptic communication that may be provided by a PVA system. As discussed below, the user reaction to the communication (labels or sensed reaction [laughs at a joke, etc.]) is used as implicit feedback data. Monitoring the user's emotional state when a communication is requested and again at reaction time is important in understanding the effect that the communication had (difference between emotional state at the two points in time) on the user. Third-party judges may be used for such purposes.

The model can be built in a variety of ways using standard machine learning algorithms. The features in the model may include characteristics of the interaction (including user questions and system responses) as well as other signals derived from additional sensors (audio, visual, physiological, etc.). For example, the model may be designed to enable the PVA system to be able to correctly interpret a user's emotional reactions to actions that the PVA system takes (e.g., tells a joke, answers questions).

During each interaction between the PVA and the user, the user's reaction (captured by video, audio, sensors, etc.) is evaluated and the model is updated through a feedback loop. With this system, responses are crafted that are a combination of the context, local time, the user's schedule, the user's surroundings, and/or the user's emotional state.

By way of example, a PVA's content and tone may be adjusted based on:
- the subject matter (e.g., news is somber, happy);
- factual details (e.g., weather report is good (sunny or much needed rain) or bad (thunderstorm or continuing rain));
- user's personal interests (e.g., when reporting sports scores, noting win/loss of favorite sports team);
- user's past interactions with the PVA and/or with other applications, services, and/or PVAs;
- user's tone of voice (e.g., hurried, frustrated, relaxed, happy);
- user's usage of words (e.g., polite, matter of fact);
- other sensory perceptions (e.g., heart rate, perspiration, temperature);
- user's reaction to PVA's response; and/or
- user's facial expression (e.g., smile, laugh, grimace, groan).

In a specific example, the communications that the PVA provides could be modified based on the inferred mood of the user. The PVA would tag the communications with various characteristics to build an initial model. For example, in the case of a joke, such characteristics may include: type (e.g., knock-knock, question-answer, animals, personal anecdotes, special dates, etc.) and topic (e.g., current events, people, sports). Then, after the communication is provided, the user's reaction (e.g., smile, laugh, grimace, groan) is captured using sensors and a feedback mechanism is used to personalize future communications for that user.

Figure 2A:
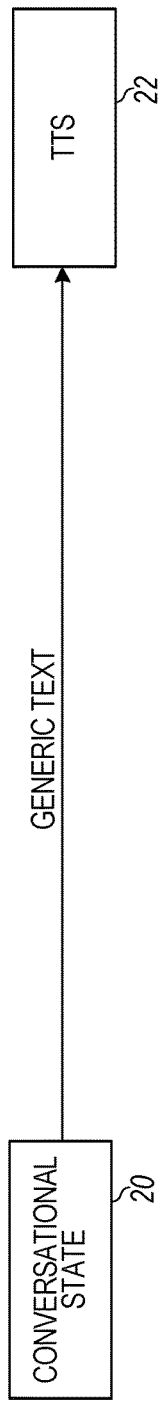
FIG. 2A illustrates a conventional PVA system where generic text generated by the PVA in a normal conversational state in response to the user input is provided to a text-to-speech (TTS) subsystem and then output to the user without consideration of the mood or environment of the user.
Figure 2B:
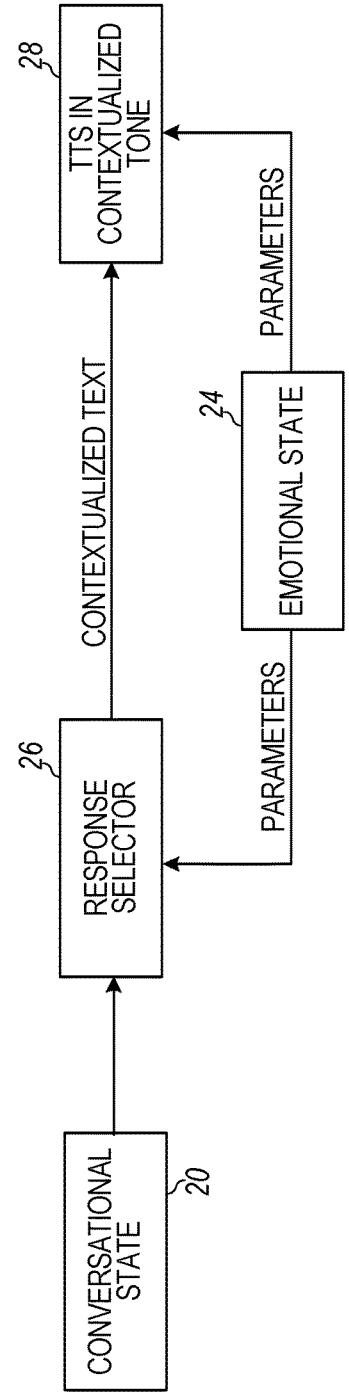
FIG. 2B illustrates a PVA system that maintains a conversational state and infers the emotional state of a conversation and uses the inferred emotional state to generate appropriate responses that are sent to a TTS subsystem that provides a contextualized response and tone in an example embodiment.

As illustrated in FIG. 2A, in conventional PVA systems, the generic text generated by the PVA in a normal conversational state 20 in response to the user input is provided to a TTS subsystem 22 and then output to the user without consideration of the mood or environment of the user. By contrast, FIG. 2B illustrates a PVA system as described herein that maintains a conversational state 20 and infers the emotional state of a conversation 24 and uses the inferred emotional state to generate appropriate responses using response selector 26 that are sent to a text-to-speech (TTS) subsystem 28 that provides a contextualized response and tone in an example embodiment. TTS subsystem 28 may be any of a number of available TTS subsystems including the Bing Speech API available through Microsoft Azure, for example. In the embodiment of FIG. 2B, observations of the user and the conversation state produce an inferred emotional state which is, in turn, used to select the emotionally appropriate conversational responses and tone of voice.

Figure 3:
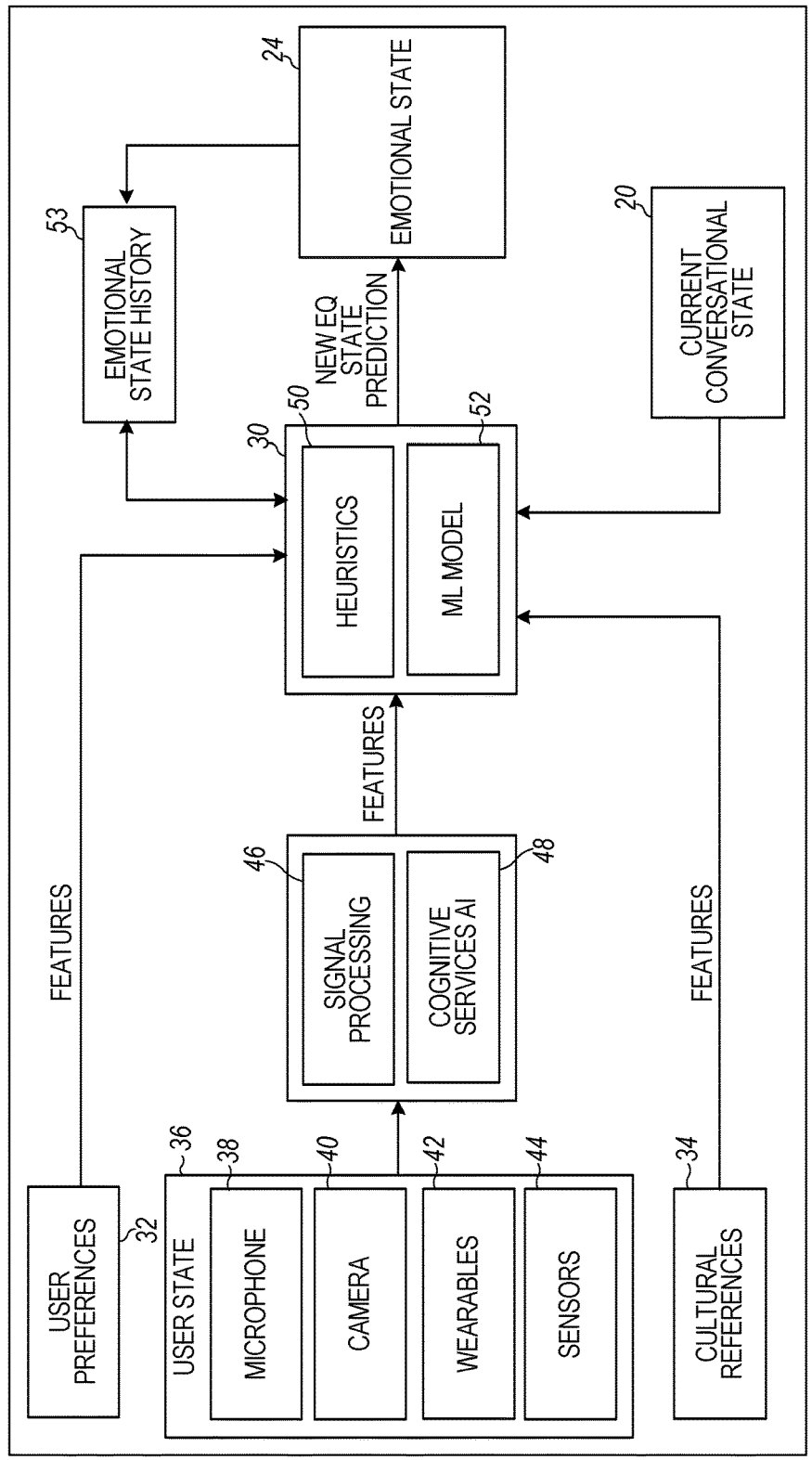
FIG. 3 illustrates how emotional state is inferred from multiple sensing sources and conditioned on conversation state and other relevant features such as user preferences and cultural context according to an example embodiment.

FIG. 3 illustrates how the emotional state is inferred from multiple sensing sources and conditioned on conversational state and other relevant features such as user preferences and cultural context according to an example embodiment. As used herein, "cultural context" means cultural factors that influence people's beliefs, preferences, and behaviors. In the embodiment of FIG. 3, the emotional state is inferred by combining a range of observations. As used herein, "EQ" means "emotional quotient," which in this case is the extent to which the PVA system can recognize the user's emotions. The emotional state can be represented in several ways, including by way of example a category (e.g. happy), a set of category-weight pairs (happy: 0.7, sad: 0.3), a vector of feature weights corresponding to the signals used in a machine learning (ML) mode, measures of valence and arousal as defined by the circumplex model of affect (Russell J A. A circumplex model of affect. Journal of Personality and Social Psychology. 1980; Vol. 39; pp. 1161-1178), a level of calmness (calm: 0.6, anxious 0.4), fear, frustration, energy level, and the like, or a matrix or decision tree of those same features. The inferred emotional state may be produced by matching observations against rules or a lookup table in a ML classifier 30, or may be generated by another type of trained artificial intelligence model such as a deep neural network.

As shown in FIG. 3, the inputs to the ML classifier 30 may include features determined from user preferences data 32 provided by the user during system setup, cultural references data 34 collected by the system during use, and user state information 36 captured using a variety of sensing devices. For example, the user state information 36 may include outputs from a microphone 38, a camera 40, wearable sensing devices 42, environmental sensors 44, and the like. The user state information 36 is provided to a signal processor 46 including cognitive/AI services 48 for generating the user features. For example, the cognitive/AI services 48 may include one or more of the cognitive services available on the Azure service platform provided by Microsoft Corporation (azure.microsoft.com/en-us/services). For example, emotion API (azure.microsoft.com/en-us/services/cognitive-services/emotion) may be used in sample embodiments herein. However, those skilled in the art will appreciate that these are just examples of services that could be used and many similar machine learning, rule-based and other AI technologies and services exist for detecting emotion from images, video, text, etc. that may be incorporated into the PVA system described herein without departing from the present description.

Such services include text analytics APIs that evaluate sentiment and topics to extract key phrases and detect language to provide an understanding of what users want; facial recognition APIs that detect, identify, analyze, organize, and tag faces in images; emotion APIs that take a facial expression in an image as an input and detect emotions including anger, contempt, disgust, fear, happiness, neutrality, sadness, and surprise; and computer vision APIs that distill actionable information from images. Other available processing services include speech emotion analysis using dedicated software that performs acoustic analysis of the speech signal. A sample software package for speech emotion analysis is PRAAT, developed by Boersma and Weenink. The services provided by signal processor 46 may also include stream analytics for real-time data stream processing from millions of Internet of Things (IoT) devices for processing the user state information 36. Such modules are also available, for example, from the Azure service platform provided by Microsoft Corporation. Other software may also be used to provide physiological monitoring of the user state from the user state information 36. For example, Cardiolens software described, for example, in Christophe Hurter and Daniel McDuff, "Cardiolens: Remote Physiological Monitoring in a Mixed Reality Environment," in Proceedings of SIGGRAPH 2017 Talks, Los Angeles, Calif., USA, August 2017, provides real-time remote measurement and hands-free visualization of vital signs, blood flow, and other normally imperceptible physiological signals in real-time from images. These and other available processing services may be selected by the system provider and processed by signal processor 46 in different embodiments. In sample embodiments, the outputs include a vector of weights with each entry corresponding to the output of a service, or a vector of weights from each service.

The features extracted by the applications running on signal processor 46 and cognitive/AI services 48 are provided with the user preference features data 32 and cultural reference features data 34 along with current conversational state information 20 to ML classifier 30 which includes heuristics software 50 and ML model 52 that together evaluate the received features against stored features to provide a new emotional state prediction as an estimate of the user's emotional state 24. The system may have many or a limited number of possible emotional states that are used to guide the PVA responses in sample embodiments. The feedback from the user as well as the calculated features may be used in sample embodiments to adjust the weightings applied to the different nodes in the machine learning model. In sample embodiments, feedback from the user takes two forms:

Implicit feedback—based on signals from the user's reaction; and

Explicit feedback—based on labels provided by users or third-party judges with access to the PVA responses and representations of the user reaction (e.g. a video for their review) and/or feedback solicited from the user, such as, "how helpful was that response?"

As also depicted in FIG. 3, the PVA system may include a data store 53 that stores a history of past user interactions with the PVA and/or emotional states for use with the heuristics 50. The data store 53 is updated with interaction data, emotional state inferences, etc. over time. As described herein, the historical data is useful for establishing a baseline emotional state for each user. Also, the history of past interactions (defined at the session/conversation level, for each dialog turn, or for each user action (in a non-conversational instantiation)) can be used to normalize feature values in the ML classifier 30, among other things that will be apparent to those skilled in the art.

It also will be appreciated that the system may start with insufficient data for a particular user. In such cases, the user's data may be initiated with data borrowed from other users having a similar demographic profile, location, interests, etc. or a combination thereof. In such case, additional data may be provided to the machine learning model from at least one of the other users having a demographic profile, location, interests, etc. similar to that of the user. This "cold start" could also use plain heuristics whereby with each usage the data is used to build and improve the ML mode.

A simple example focusing on jokes will now be used to explain how such features are implemented in sample embodiments. It will be appreciated by those skilled in the art that this example may be generalized to any scenario where the PVA system takes some action and the user reacts. In the following example, it is important to note that there are at least three phases:

Joke request (user asks for joke)
Joke telling (user listens to joke)
Joke reaction (user reacts)

The PVA system tracks user emotional state at all three phases. The user's reaction may be used as an implicit label for the joke. There may also be a fourth phase where the PVA system asks users to explicitly label the funniness of the joke. Some of the user's reaction in phase three may also bleed into phase two if the user can anticipate the system action (joke punchline in this case).

The features in the model are therefore based on the joke and what can be inferred about the user's emotional state at joke request time. The labels for the model are based on what can be sensed at phase three (and perhaps part of phase two)—especially the difference between phase three and phase one (which captures the effect that the joke had on the user).

In sample embodiments, the ML model is personalized, meaning that a new model would be created for each person, or at very least created for a cohort of users initially (to address cold start problems), and then adapted over time for individuals (weight would shift from cohort to personal model as more data from that user becomes available). Personalization means that previous jokes/emotional states could be used in the system modeling (e.g., what joke did the user just ask? What was the user's emotional state after asking that?).

Features are computed at different times, depending on the application, and features also could be based on changes in emotional state over time (e.g., trending more positive). For personalization of communications, the PVA system may store signals from the time immediately after the communication was elicited for until a short time after the response was provided by the PVA system. Storing current state in an emotional state table (one of a fixed set of emotions or as a weighted collection of features) is likely to be important in prediction since emotional state at the time the communication is elicited is likely to be a strong determinant of emotional state when the communication is provided.

In addition, the PVA system described herein can learn which situations and emotional responses resonate with users and can generate a store comprising tuples including, for example, {situation, system emotion response, user reaction}. This data can be used to train machine learning algorithms to learn the mapping between situation and the most appropriate emotional reaction for the user, for the current cohort of users, or for the entire population of users.

Figure 4:
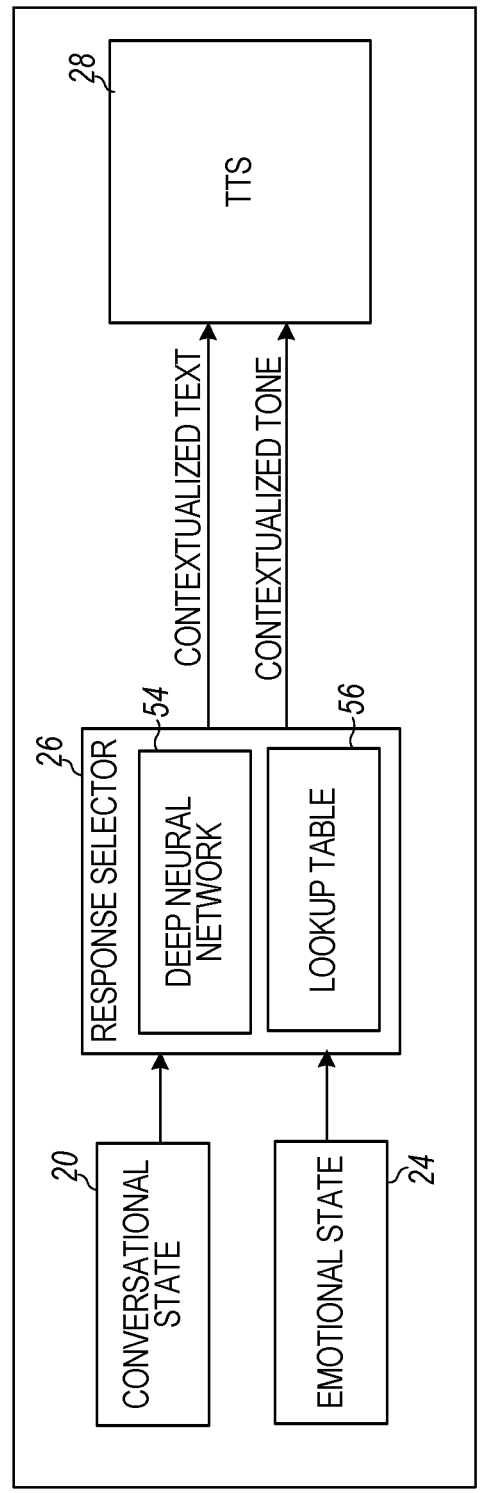
FIG. 4 illustrates how, given a conversational state and inferred emotional state, a response selector may vary the text response sent to the TTS subsystem whereby responses may be varied based on rules or lookups against pre-selected responses or encoded as responses generated by a learned model such as a deep neural network, according to an example embodiment.

FIG. 4 illustrates how, given a conversational state 20 and inferred emotional state 24, response selector 26 may vary the text response sent to the TTS subsystem 28 whereby responses may be varied based on rules or lookups against pre-selected responses or encoded as responses generated by a learned model such as a deep neural network to generate conversationally and emotionally appropriate responses having the appropriately contextualized text and tone according to an example embodiment. In sample embodiments, the neural network generates a representation of the user's emotional state. For example, the representation of the user's emotional state may be a high-dimensional vector of weights that can richly represent the emotional state of the user. In one instantiation, this vector can be compared against similar vectors computed over the space of possible responses. The distance between the two vectors (e.g., using cosine similarity) is one way in which the deep neural network system could select the best response (closer=better).

The PVAs described herein may be viewed as empathic as their responses reflect the determined awareness of the users' preferences and cultural context as well as the users' reactions to the actions of the PVA, as captured by a variety of sensors, including web cams, microphones, wearable devices, and the like. The ML model 52 may establish normal/baseline reactions based on prior interactions between the PVA and the user and/or between the user and other devices by providing data from other devices into the ML model 52. The heuristics software 50 may be further used to update models of user reactions based on implicit feedback (laughs, smiles) and explicit feedback (ratings). Also, the ML model 52 may learn attributes of the trigger that causes particular reactions by the user, for example, the features of jokes that make the user laugh. The system may then tailor the PVA's actions based on those attributes by, for example, selecting jokes that particular users are likely to find amusing. Those skilled in the art will appreciate that the learning can be done over many users in aggregate, so as to learn what is generally socially preferred, with personalization added as a way to meet the needs of a specific user.

The PVAs described herein process different combinations of inputs to evaluate the user's mood. In example embodiments, the PVAs described herein use user tone, language use, volume, and facial recognition as inputs to measure/predict mood. For example, a user yelling his commands to the PVA and speaking fast with harsh language may be assumed to be in a bad or anxious mood. The PVAs described herein also use signals from the user's surroundings, like the user's location, local time, schedule, other people around the user, objects, and volume as inputs to measure/predict mood. For example, children screaming in the kitchen may indicate that the user is in an irritated or anxious mood. The PVAs described herein also use awareness of the user's usage of other devices and apps as inputs to measure/predict mood. For example, the language used in the message the user just sent his spouse may be indicative of the user's mood.

These inputs are processed to provide outputs from an audio/visual output device of the PVA that augment the tone, language, and volume of the PVA's response based on the evaluated mood of the user and/or to augment the PVA's visual presentation of persona and information, including animations and colors. The user's evaluated mood may be used to determine what information may be worth sharing and what may not be worth sharing to help get to the user into a more optimal mood.

In some embodiments, the PVA proactively reaches out to the user based on his mood with information calculated to optimize the user's mood. For example, the PVA may proactively provide a knock-knock joke when the PVA determines that the user is sad based on changes in their facial expression after reading an article on his phone, or getting the user into a better mood before giving him bad news, like poor weather for the day or bad news about a favorite celebrity. The PVA may also detect rising user frustration while using a first-party or third-party skill and adjust its response accordingly (e.g., by explaining options in more detail or even connecting the user directly to customer service). The PVA may also learn and form a pattern of the user's mood over a longer period and use this information to predict the user's mood ahead of time. For example, the PVA may learn over time how an email from the user's manager may impact the user's mood and can augment how it communicates the email to the user to proactively combat the impact.

It will be appreciated that the PVA in particular embodiments may include a variety of voice, text, or other communication interfaces, and may operate to collect a variety of location and context information of a user for personal customization of information and actions. Examples of PVAs in sample embodiments include MICROSOFT® Cortana, AMAZON® Alexa, GOOGLE® Assistant, APPLE® Siri, SAMSUNG® Bixby, among others, but it will be understood that the techniques discussed herein are not limited to any particular implementation of a PVA. Further, while the terminology used herein may relate to specific programming techniques and interfaces provided by the MICROSOFT® Cortana PVA, it will be understood that similar programming techniques and interfaces might be incorporated by other services and companies (including third-party companies that integrate or customize other features of such PVAs). It will also be appreciated that the PVA may be implemented as a hardware device comprising a housing for the processing circuitry, one or more speakers, one or more sensing devices, and a memory device including implementing software or may be implemented on a more generic software platform like Cortana™ on Windows OS™ available from Microsoft Corporation (which may involve a number of cloud components), or a combination of the hardware device and software platform.

PVAs may use skills or similar functions to complete tasks and perform certain actions. A brief example of a skill might include a restaurant interaction skill, allowing a user to issue a command, such as "Reserve a table at Mario's Italian Restaurant," or "Order a Coffee from Fourth Coffee Company." In an example, a "third-party" skill refers to a skill that is imported or integrated into the PVA from another source, such as another developer or service (although a third-party skill may include skill features directly developed for the PVA by the same developer or company). As a further example, a third-party skill might leverage a different chat bot and external data source on behalf of another entity (e.g., an external chat bot hosted by a restaurant reservation service) in order to accomplish the skill action within the PVA.

In further examples, a PVA may be used to proactively suggest a skill to users at the right moment based on context (e.g., ordering food for a regular lunch meeting, or turning on the lights when they get home). Further to the techniques discussed herein, a PVA may be configured to broker connections between users and bots exposed from the skills, including third-party bots, so that users can easily and naturally discover and interact with an appropriate bot at the right time and in the right context.

In any of the scenarios discussed herein, a PVA may integrate the use of natural language processing of voice or text conversations to interpret queries and commands from humans in an intelligent way to perform an appropriate action. Thus, the techniques discussed herein may be applicable to a variety of configurations and forms of a PVA. Further, some references to the skills and service interfaces discussed herein are examples of voice- and text-based bots, but it will be understood that other forms of bots and automated or semi-automated agents (such as virtual reality or graphical-based agents) may also be used.

Figure 5:
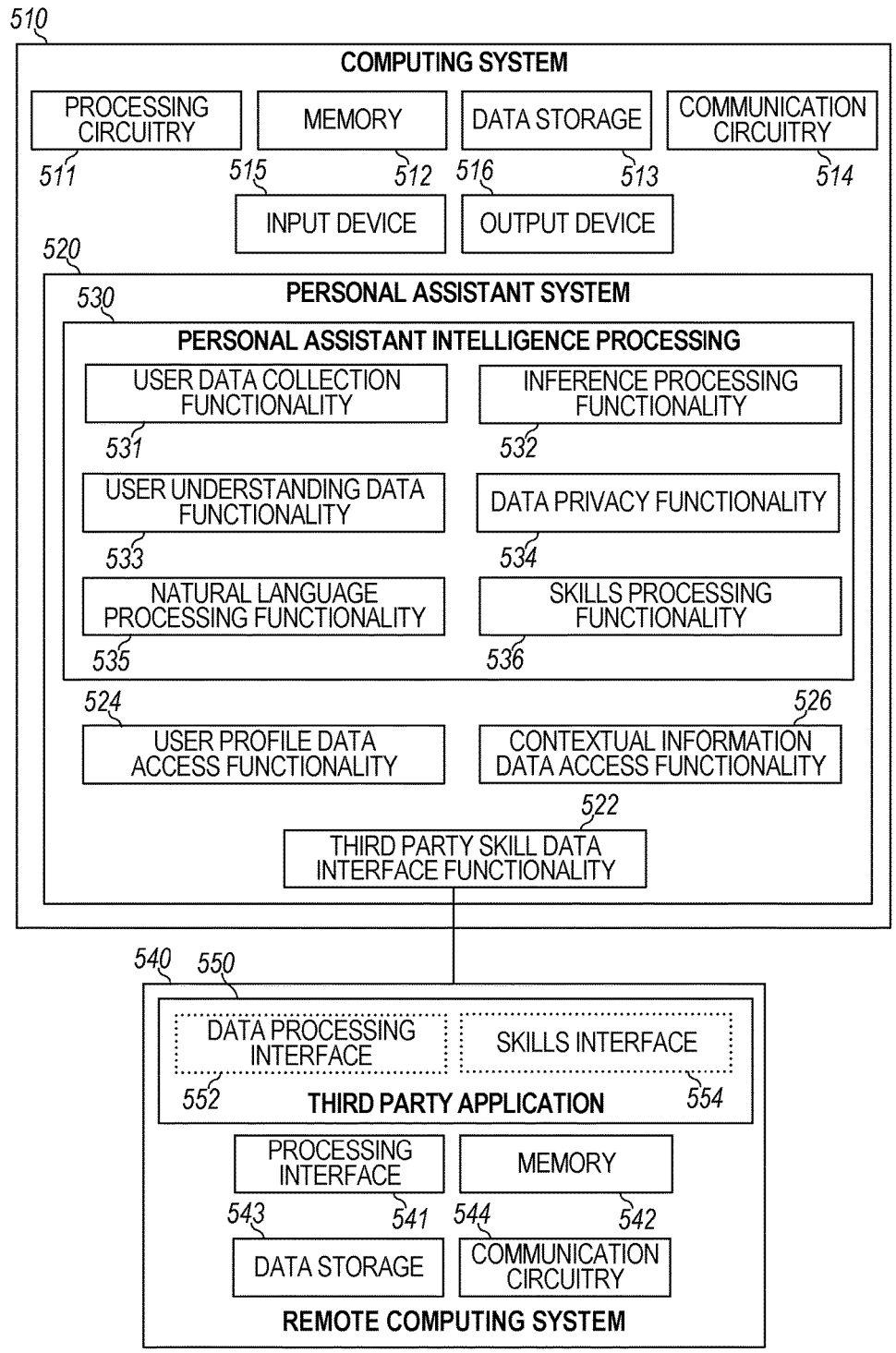
FIG. 5 illustrates a block diagram of hardware and functional components of an example computing system configuration to implement operations for implementing a personal assistant service, according to an example embodiment.

FIG. 5 illustrates a block diagram of hardware and functional components of an example computing system configuration to implement operations for implementing a personal assistant service for operating a PVA, according to an example embodiment. The example operations described above with reference FIGS. 1 to 4, for example, may be performed at or among a local (e.g., client) or remote (e.g., server) computing device, and distributed component examples of the same. In an example, the software application (for the personal assistant system 520) is adapted to execute exclusively on a single computing device (e.g., computing system 510) with use of a processor and a memory device, with operation of respective processes as discussed herein. In a further example, the software application is adapted to execute some of the processes on a local computing device (e.g., computing system 510), with additional data and processing for a third-party skill being performed at a remote computing device (e.g., remote computing system 540).

FIG. 5 more specifically illustrates selected hardware and functional components of a computing system 510 and a remote computing system 540 to implement operations for personalization of skills within a personal assistant service for operating the empathetic PVA described herein. It will be understood, that although certain hardware and functional components are depicted in FIG. 5 and in other drawings as separate systems or services, the features of certain of the components may be integrated into a single service or subsystem. Further, although only one local computing system and one remote computing system is configured, it will be understood that the features of these systems may be distributed in some settings among one or multiple computing systems (including in cloud-based processing settings).

As shown, the computing system 510 includes processing circuitry 511 (e.g., a CPU) and a memory 512 (e.g., volatile or non-volatile memory) used to perform electronic operations (e.g., via instructions) for implementing personalization of personal assistant skills (e.g., to implement the techniques depicted and described for FIGS. 1-4), specifically with the execution of a personal assistant system 520; data storage 513 to store commands, instructions, and other data for operation and execution of the personal assistant system 520; communication circuitry 514 to communicate with an external network or devices (e.g., the remote computing system 540) via wired or wireless networking components for operation of the personal assistant system 520; an input device 515 (e.g., an alphanumeric, point-based, tactile, audio input device) to receive input (e.g., control commands) from a human user for the personal assistant system 520; and an output device 516 (e.g., visual, acoustic, haptic output device) to provide output (e.g., visual, acoustic, haptic output) to the human user from the personal assistant system 520.

In an example, the computing system 510 is adapted to execute software for the personal assistant system 520, through processing components or functionality (e.g., circuitry or software instructions), including personal assistant intelligence processing 530 in addition to user profile data access functionality 524, contextual information data access functionality 526, and third-party skill interface functionality 522. The functionality depicted in the personal assistant intelligence processing 530 includes: user data collection functionality 531, inference processing functionality 532, user understanding data functionality 533, data privacy functionality 534, natural language processing functionality 535, and skills processing functionality 536. In some examples, the software for the respective processing functionality may contact an external service (e.g., a cloud service) of the personal assistant platform to fully perform the processing functionality (e.g., to analyze natural language queries, or to store or obtain user data).

In a further example, the computing system 510 may receive inquiries from a third-party application 550 (e.g., that operates a third-party skill bot or a service for a third-party skill) of a remote computing system 540. These inquiries, for example, may include requests to access personalization data via the third-party skill interface functionality 522. As shown, the remote computing system 540 includes processing circuitry 541 (e.g., a CPU) and a memory 542 (e.g., volatile or non-volatile memory) used to perform electronic operations (e.g., via instructions) for execution of the third-party application 550; data storage 543 to store commands, instructions, and other data for operation and use of the third-party application 550; and communication circuitry 544 to communicate with an external network or devices via wired or wireless networking components for communicating data. In an example, the third-party application 550 includes a data processing interface 552 and a skills interface 554 to implement features (and associated commands and actions) of a third-party skill. Other aspects may be performed by the remote computing system 540 to implement the techniques discussed herein.

Figure 6:
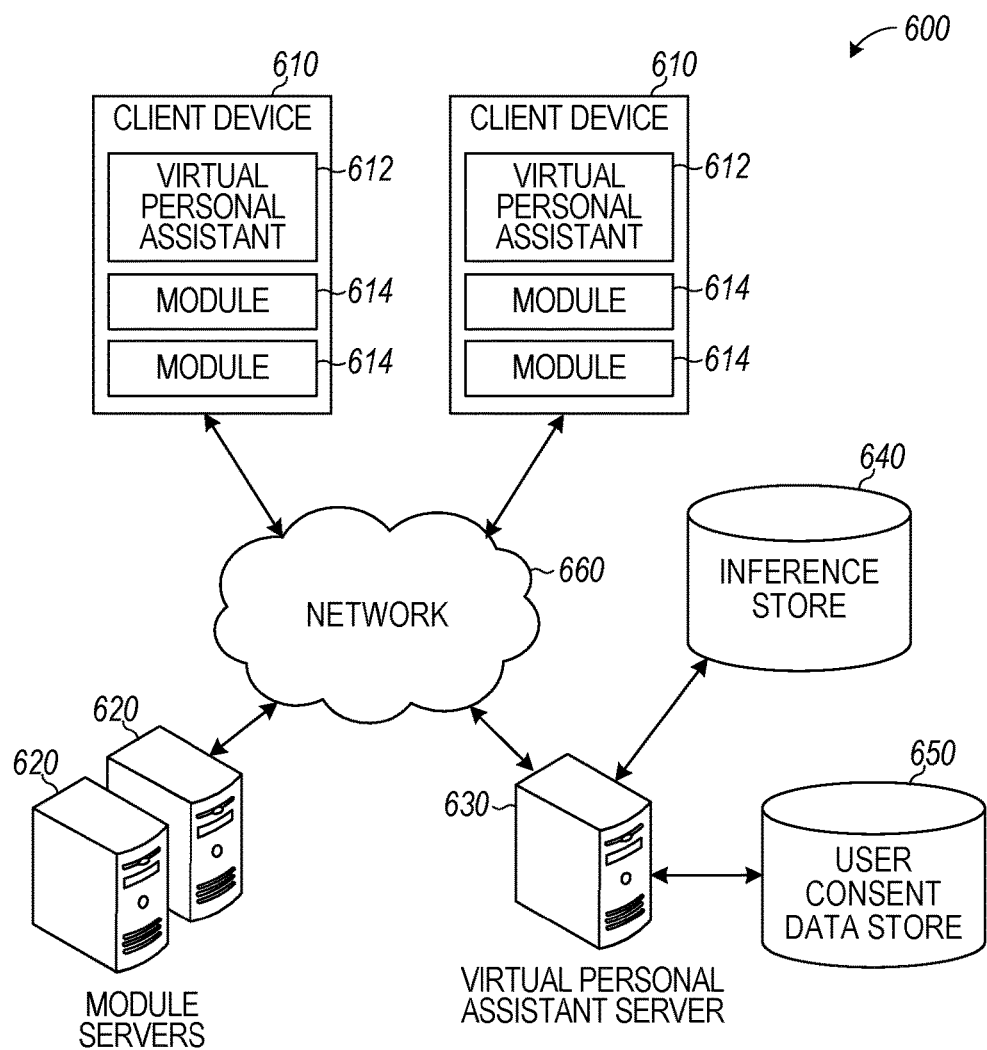
FIG. 6 illustrates an example PVA system in accordance with an example embodiment.

FIG. 6 illustrates an example PVA system 600 in accordance with an example embodiment. As shown, the system 600 includes client devices 610, module servers 620, a virtual personal assistant server 630, an inference store 640, a user consent data store 650, and a network 660. The network 660 allows the client devices 610, module servers 620, virtual personal assistant server 630, inference store 640, and user consent data store 650 to communicate with one another. The network 660 may include one or more of the internet, an intranet, a local area network (LAN), a wide area network (WAN), a wired network, a wireless network, a virtual private network (VPN), and the like.

Each client device 610 may be a laptop computer, a desktop computer, a mobile phone, a tablet computer, a smart speaker device, a smart television, a smart watch, a personal digital assistant (PDA), and the like. Each client device 610 may be associated with a user account, with each user account corresponding to at least one client device 610. Each client device 610 includes a PVA 612 (e.g., Apple Siri®, Microsoft Cortana®, or Ok Google®) and module(s) 614. The module(s) 614 may include browser applications (e.g., web applications within a web browser), mobile phone or tablet computer applications, or smart speaker device skills. The module(s) 614 may include native modules which are provided on the client device 610 by the developer/manufacturer of the client device 610, and third-party modules that are installed by the user after the user's acquisition of the client device 610. An example native module is a weather application provided by the developer/manufacturer of the client device 610. An example third party module is a restaurant reservation application/skill or a movie ticket application/skill. In example embodiments, such modules may also include the user state sensing devices 36 such as a microphone 38, camera 40, or sensors 44 described above with respect to FIG. 3. Each module 614 may include a skill of a smart speaker device, an application of a mobile phone or tablet computer, a page accessible via a browser, or features of a wearable device 42, as appropriate. In some cases, the PVA 612 is native to the client device 610, and the module 614 is not native to the client device 610.

Each module server 620 implements the module 614. For example, a weather forecasting module may be coupled with a weather server that stores current weather conditions and weather forecasts. A restaurant reservation module may be coupled with a restaurant reservation server that communicates with individual restaurants to notify them of reservations being made. A movie ticket module may be coupled with a movie ticket server that stores cinema locations and movie show times and includes an interface for purchasing tickets. An empathetic voice module as described herein may also include at least the communications software for implementing the empathetic response features described herein. In some cases, each module 614 is associated with a back end at a module server 620. However, some modules 614 may lack an associated module server 620 and may be implemented completely at the client device 610. In other words, the client device 610 may implement the functions of one or more of the module servers 620. Similarly, the modules 614 of the client device 610 may provide the user state features 36, user preference features data 32, and cultural reference features data 34 to one or more module servers 620 for implementation of the cognitive/AI services 48 and machine learning services 30 described above.

The PVA server 630 implements the PVA 612. For example, PVA server 630 may be coupled with a web searching interface to answer the user's questions, as well as an interface for managing the user's email, text messages, calendar, and the like. The PVA server 630 may generate inferences about the user based on its interaction with the user and the sensor inputs for facial recognition and other cognitive/AI features as described above. The PVA server 630 may store those inferences in the inference store 640. The PVA 612 may receive user consent for sharing the inferences with the module(s) 614 and the associated module server(s) 620, as described below. Indicia of the user's consent (or lack of consent) may be stored in the user consent data store 650. As shown, the PVA 612 has a back end at the PVA server 630. However, in some cases, the PVA 612 is implemented completely at the client device 610. In other words, the client device 610 may implement the functions of the PVA server 630.

According to some implementations, the PVA server 630 determines, based on interaction of the user with the PVA 612 at one or more client devices 610 associated with an account of the user, multiple inferences about the user (e.g., about the user's mood). The PVA server 630 stores the multiple inferences in the inference store 640. The PVA server 630 stores, in the user consent data store 650, user consent data representing whether the user provided consent for the module(s) 614 to access at least a portion of the inferences in the inference store 640. The PVA server 630 receives, from the module 614, a request for a specified inference from the inference store 640. The PVA server 630 verifies the user consent data associated with the specified inference and the module 614. The PVA server 630 provides the specified inference to the module 614 in response to verifying the user consent data.

As shown, the inference store 640 and the user consent data store 650 reside on separate machines from the client device(s) 610 and the PVA server 630. However, in some examples, the inference store 640 and/or the user consent data store 650 may reside at one of the client device(s) 610. In some examples, the inference store 640 and/or the user consent data store 650 may reside at the PVA server 630. In some examples, one of the client device(s) 610 may implement the functions and store the data of one or more of the module server(s) 620 or the PVA server 630.

Although the present examples refer to various forms of cloud services and infrastructure service networks, it will be understood that may respective services, systems, and devices may be communicatively coupled via various types of communication networks. Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A, or other personal area, local area, or wide area networks).

Embodiments used to facilitate and perform the electronic operations described herein may be implemented in one or a combination of hardware, firmware, and software. The functional units or capabilities described in this specification may have been referred to or labeled as components, processing functions, or modules, in order to more particularly emphasize their implementation independence. Such components may be embodied by any number of software or hardware forms. For example, a component or module may be implemented as a hardware circuit comprising custom circuitry or off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. The executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as the command and control service) may take place on a different processing system (e.g., in a computer in a cloud-hosted data center), than that in which the code is deployed (e.g., in a test computing environment). Similarly, operational data may be included within respective components or modules, and may be embodied in any suitable form and organized within any suitable type of data structure. The operational data may be collected as a single data set, or may be distributed over different locations including over different storage devices.

Certain embodiments are described herein as including logic or a number of components or mechanisms. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

In some embodiments, a hardware component may be implemented mechanically, electronically, or any suitable combination thereof. For example, a hardware component may include dedicated circuitry or logic that is permanently configured to perform certain operations. For example, a hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

Accordingly, the phrase "hardware component" should be understood to encompass a tangible record, be that a record that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

Some aspects of the subject technology involve collecting personal information about users. It should be noted that the personal information about a user is collected after receiving affirmative consent from the users for the collection and storage of such information. Persistent reminders (e.g., email messages or information displays within an application) are provided to the user to notify the user that his/her information is being collected and stored. The persistent reminders may be provided whenever the user accesses an application or once every threshold time period (e.g., an email message every week). For instance, an arrow symbol may be displayed to the user on his/her mobile device to notify the user that his/her global positioning system (GPS) location is being tracked. Personal information is stored in a secure manner to ensure that no unauthorized access to the information takes place. For example, medical and health related information may be stored in a Health Insurance Portability and Accountability Act (HIPAA) compliant manner.

Example Machine and Software Architecture

The components, methods, applications, and so forth described in conjunction with FIGS. 1-4 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes such as those described herein. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the disclosed subject matter in different contexts from the disclosure contained herein.

Figure 7:
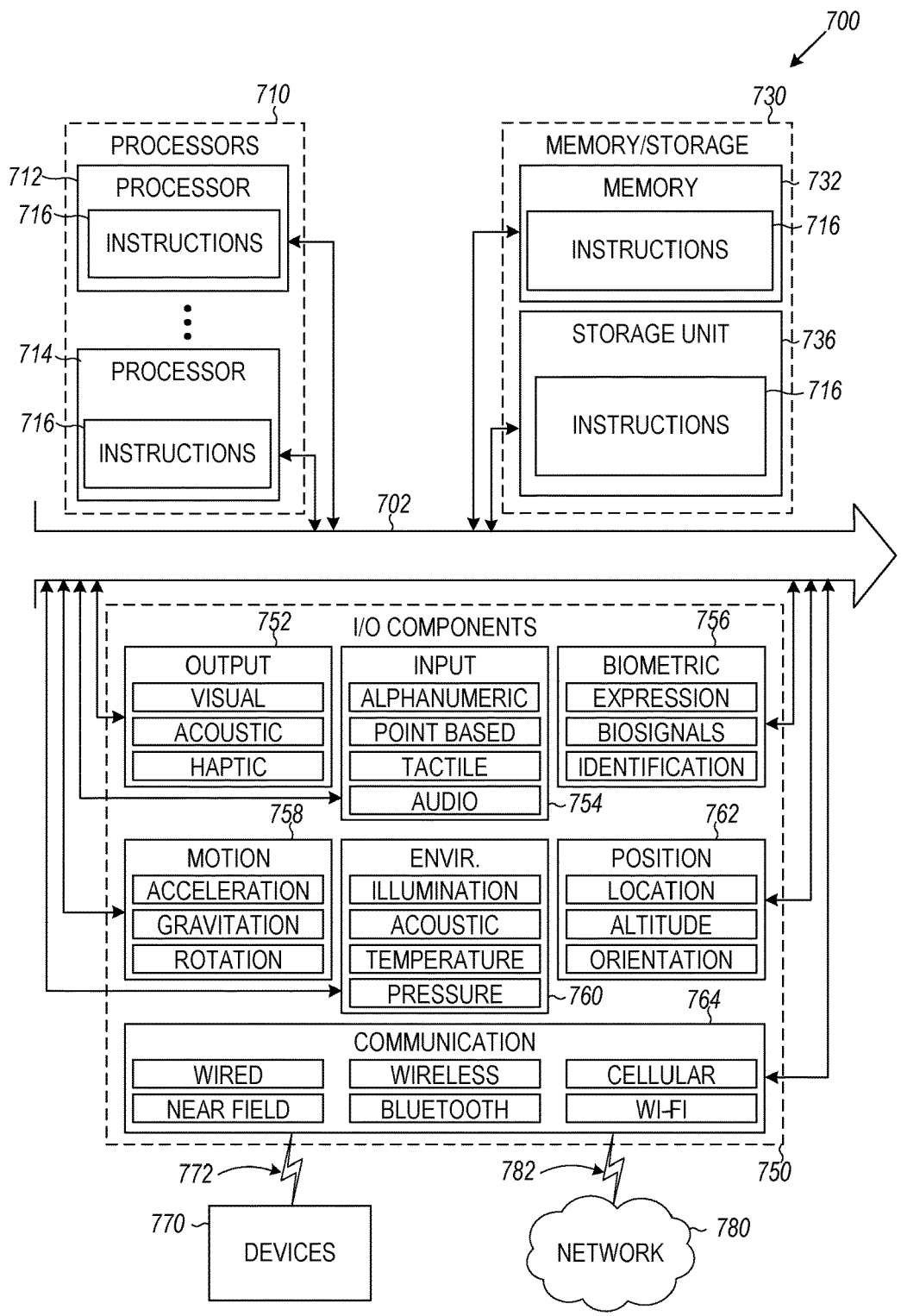
FIG. 7 illustrates a block diagram of components of a machine able to read instructions from a machine-readable medium and to perform any one or more of the methodologies discussed herein.

FIG. 7 is a block diagram illustrating components of a machine 700 which may be a PVA 612, for example, which according to some example embodiments is able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. The instructions 716 transform the general, non-programmed machine into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, PC, a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory/storage 730, and I/O components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions contemporaneously. Although FIG. 7 shows multiple processors 710, the machine 700 may include a single processor with a single core, a single processor with multiple cores (e.g., a multi-core processor), multiple processors with a single core, multiple processors with multiples cores, or any combination thereof.

The memory/storage 730 may include a memory 732, such as a main memory, or other memory storage, and a storage unit 736, both accessible to the processors 710 such as via the bus 702. The storage unit 736 and memory 732 store the instructions 716 embodying any one or more of the methodologies or functions described herein. The instructions 716 may also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the memory of the processors 710 are examples of machine-readable media.

As used herein, "machine-readable medium" means a device able to store instructions (e.g., instructions 716) and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine (e.g., processors 710), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. For example, in addition to a speaker, the output components 752 may include a visual output device adapted to provide augmented visual colors, animations, and presentation of information that is determined to best communicate and improve the user's mood to an optimal state as described herein. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure bio-signals (e.g., blood pressure, heart rate, body temperature, perspiration, or brain waves), measure exercise-related metrics (e.g., distance moved, speed of movement, or time spent exercising) identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or other suitable device to interface with the network 780. In further examples, the communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include Radio Frequency Identification (RFID) tag reader components, NFC smart tag detection components, optical reader components, or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

In various example embodiments, one or more portions of the network 780 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 7G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., HTTP). Similarly, the instructions 716 may be transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Those skilled in the art will appreciate that the personal virtual assistant system described herein provides many technical advantages over conventional personal virtual assistant systems. For example, the personal virtual assistant system described herein improves the user interaction performance, provides contextualized communications, better user understanding and inference processing, more efficient communications as the communications are better targeted to the needs of the user, and improved personalization characteristics, all of which will lead to increased user satisfaction and potentially greater usage of the personal virtual assistant system.

Those skilled in the art also will appreciate that the personal virtual assistant system described herein may be implemented as a standalone consumer electronic device that includes sensors and the AI model running in processing circuitry on-board, and doing online training. Those skilled in the art will further appreciate that the personal virtual assistant described herein may be implemented in an embodiment where the personal virtual assistant system includes sensors but the AI and machine learning features are implemented on the server side via internet communication. For instance, the communications may be sent up to the cloud and the adjustment/retraining of the machine learning model might be done offline by another computer system or in a batch process. On the other hand, the emotional intelligence could live on the PVA device (for performance or privacy reasons) or in the cloud (or a combination of both). These and other embodiments are included within the scope of the following examples.

NUMBERED EXAMPLES

Certain embodiments are described herein as numbered examples 1, 2, 3, etc. These numbered examples are provided as examples only and do not limit the subject technology.

Example 1 is a personal virtual assistant system comprising processing circuitry, a speaker, at least one sensing device that collects user state information relating to an emotional state of a user from at least the user's voice, and a memory device having instructions stored therein, wherein the instructions, which when executed by the processing circuitry, configure the processing circuitry to: receive a communication from the user that elicits a response from the personal virtual assistant system; determine from at least the user state information collected by the at least one sensing device an emotional state of the user using a machine learning model; generate a response that takes into account the determined emotional state of the user; output the generated response to the user using language, volume, and tone over the speaker selected to change the determined emotional state of the user to improved different emotional state; and train the machine learning model based on the user's response to the outputted response.

Example 2 is in example as in Example 1 wherein the at least one sensing device senses the user's tone of voice and language used in communicating with the personal virtual assistant system.

Example 3 is an example as in Example 1 wherein the at least one sensing device further senses the user's facial expression to extract user state information relating to the emotional state of the user from the user's facial expression.

Example 4 is an example as in Example 1 wherein the at least one sensing device further senses the user's context from at least one of the user's location, local time, schedule, and surroundings and the user's prior interactions with the personal virtual assistant system or other devices.

Example 5 is an example as in Example 1 wherein the memory device further comprises instructions stored therein, which when executed by the processing circuitry, configure the processing circuitry to output the generated response to the user using language, volume, and tone that accounts for the determined emotional state of the user by modifying at least one of a speed, tone, and language in the response to the user.

Example 6 is an example as in Example 1 further comprising a visual output device, wherein the memory device further comprises instructions stored therein, which when executed by the processing circuitry, configure the processing circuitry to cause the visual output device to provide at least one of modified visual colors and animations in the response to the user depending upon the determined emotional state of the user.

Example 7 is an example as in Example 1 wherein the memory device further comprises instructions stored therein, which when executed by the processing circuitry, configure the processing circuitry to modify when and how the response is provided to the user based upon the user's determined emotional state at the time the response is to be provided.

Example 8 is an example as in Example 1 wherein the memory device further includes instructions stored therein, which when executed by the processing circuitry, configure the processing circuitry to receive user preferences data and cultural references data that the machine learning model uses with the user state information as current emotional state parameters from which to determine the emotional state of the user.

Example 9 is an example as in Example 1 further comprising a housing for the processing circuitry, speaker, at least one sensing device, and memory device, wherein the memory device further includes instructions stored therein, which when executed by the processing circuitry, configure the processing circuitry to process the user state information using artificial intelligence services to determine a user's current emotional state parameters.

Example 10 is an example as in Example 9 wherein the memory device further includes instructions stored therein, which when executed by the processing circuitry, configure the processing circuitry to apply heuristics to the user's response to the outputted response and the user's determined current emotional state parameters to train the machine learning model.

Example 11 is an example as in Example 1 wherein the memory device further comprises instructions stored therein, which when executed by the processing circuitry, configure the processing circuitry to generate a response that takes into account the determined emotional state of the user by varying the response based on rules or lookups stored in a lookup table.

Example 12 is an example as in Example 1 wherein the memory device further comprises instructions stored therein, which when executed by the processing circuitry, configure the processing circuitry to generate a response that takes into account the determined emotional state of the user by using a deep neural network to generate conversationally and emotionally appropriate responses having contextualized text and tone according to the determined emotional state of the user.

Example 13 is an example as in Example 1 wherein the memory device further comprises instructions stored therein, which when executed by the processing circuitry, configure the processing circuitry to provide feedback to the machine learning model to inform the machine learning model of the user's response to the outputted response and to update the machine learning model to reflect at least one of the user's response determined from the user state information and user feedback ratings.

Example 14 is an example as in Example 1 wherein the memory device further comprises instructions stored therein, which when executed by the processing circuitry, configure the processing circuitry to train the machine learning model as to what attributes of the response provided to the user elicits a particular reaction from the user.

Example 15 is an example as in Example 14 wherein the memory device further comprises instructions stored therein, which when executed by the processing circuitry, configure the processing circuitry to cause the machine learning model to generate responses expected to elicit the particular reaction from the user based on the emotional state of the user.

Example 16 is an example as in Example 1 wherein the memory device further includes instructions stored therein, which when executed by the processing circuitry, configure the processing circuitry to match the user against other users using demographic profiles, location, or interests or a combination thereof and to provide additional data to the machine learning model from at least one of the other users having a demographic profile, location, or interests or a combination thereof similar to that of the user.

Example 17 is an example as in Example 1 wherein the memory device further includes instructions stored therein, which when executed by the processing circuitry, configure the processing circuitry to determine what information may be shared with the user based on the determined emotional state of the user and what information may be shared with the user at a later time when the user is determined to be in a different emotional state.

Example 18 is an example as in Example 1 wherein the memory device further includes instructions stored therein, which when executed by the processing circuitry, configure the processing circuitry to learn a pattern of the emotional state of the user over time, to provide the pattern of the emotional state as input to the machine learning model, and to predict an emotional state of the user when a particular event or environmental condition is detected by the at least one sensing device.

Example 19 is a machine readable medium that stores instructions thereon that when executed by one or more processing devices cause the one or more processing devices to implement a method of providing empathetic responses from a personal virtual assistant system, comprising the steps of receiving a communication from a user that elicit a response from the personal virtual assistant system; sensing at least the user's voice; collecting user state information relating to an emotional state of the user from at least the user's voice; determining from at least the collected user state information an emotional state of the user using a machine learning model; generating a response that takes into account the determined emotional state of the user; outputting the generated response to the user using language, volume, and tone selected to change the determined emotional state of the user to improved different emotional state; and training the machine learning model based on the user's response to the outputted response.

Example 20 is a method comprising the steps of receiving communications from a user that elicit responses from a personal virtual assistant system; providing responses to the communications from the user; sensing at least the user's voice during at least one of the communications; collecting user state information relating to an emotional state of the user from at least the user's voice during the at least one of the communications; during the communications, determining from at least the collected user state information emotional states of the user using a machine learning model at different times during the communications; tracking an emotional state of the user during the communications using the user state information; and using a difference in emotional state during the communications as a label for at least one response to the communications provided to the user.

In the above Detailed Description, various features may be grouped together to streamline the disclosure. However, the claims may not set forth every feature disclosed herein as embodiments may feature a subset of the features. Further, embodiments may include fewer features than those disclosed in a particular example. Thus, the following claims are hereby incorporated into the Detailed Description, with a claim standing on its own as a separate embodiment.

What is claimed is:

1. A personal virtual assistant system, comprising:
processing circuitry;
a speaker;

at least one sensing device that collects user state information relating to an emotional state of a user from at least the user's voice; and a memory device having instructions stored therein, wherein the instructions, which when executed by the processing circuitry, configure the processing circuitry to:

receive a communication from the user that elicits a response from the personal virtual assistant system;

determine from at least the user state information collected by the at least one sensing device an emotional state of the user using a machine learning model;

generate a response that takes into account the determined emotional state of the user;

output the generated response to the user using language, volume, and tone over the speaker selected to change the determined emotional state of the user to a different emotional state; and train the machine learning model based on the user's response to the outputted response to learn what attributes of the outputted response elicits a particular reaction from the user.

2. The personal virtual assistant system of claim 1, wherein the at least one sensing device senses the user's tone of voice and language used in communicating with the personal virtual assistant system.

3. The personal virtual assistant system of claim 1, wherein the at least one sensing device further senses the user's facial expression to extract user state information relating to the emotional state of the user from the user's facial expression.

4. The personal virtual assistant system of claim 1, wherein the at least one sensing device further senses the user's context from at least one of the user's location, local time, schedule, and surroundings and the user's prior interactions with the personal virtual assistant system or other devices.

5. The personal virtual assistant system of claim 1, wherein the memory device further comprises instructions stored therein, which when executed by the processing circuitry, configure the processing circuitry to output the generated response to the user using language, volume, and tone that accounts for the determined emotional state of the user by modifying at least one of a speed, tone, and language in the response to the user.

6. The personal virtual assistant system of claim 1, further comprising a visual output device, wherein the memory device further comprises instructions stored therein, which when executed by the processing circuitry, configure the processing circuitry to cause the visual output device to provide at least one of modified visual colors and animations in the response to the user depending upon the determined emotional state of the user.

7. The personal virtual assistant system of claim 1, wherein the memory device further comprises instructions stored therein, which when executed by the processing circuitry, configure the processing circuitry to modify when and how the response is provided to the user based upon the user's determined emotional state at the time the response is to be provided.

8. The personal virtual assistant system of claim 1, wherein the memory device further includes instructions stored therein, which when executed by the processing circuitry, configure the processing circuitry to receive user preferences data and cultural references data that the machine learning model uses with the user state information as current emotional state parameters from which to determine the emotional state of the user.

9. The personal virtual assistant system of claim 1, further comprising a housing for the processing circuitry, speaker, at least one sensing device, and memory device, wherein the memory device further includes instructions stored therein, which when executed by the processing circuitry, configure the processing circuitry to process the user state information using artificial intelligence services to determine a user's current emotional state parameters.

10. The personal virtual assistant system of claim 9, wherein the memory device further includes instructions stored therein, which when executed by the processing circuitry, configure the processing circuitry to apply heuristics to the user's response to the outputted response and the user's determined current emotional state parameters to train the machine learning model.

11. The personal virtual assistant system of claim 1, wherein the memory device further comprises instructions stored therein, which when executed by the processing circuitry, configure the processing circuitry to generate a response that takes into account the determined emotional state of the user by varying the response based on rules or lookups stored in a lookup table.

12. The personal virtual assistant system of claim 1, wherein the memory device further comprises instructions stored therein, which when executed by the processing circuitry, configure the processing circuitry to generate a response that takes into account the determined emotional state of the user by using a deep neural network to generate conversationally and emotionally appropriate responses having contextualized text and tone according to the determined emotional state of the user.

13. The personal virtual assistant system of claim 1, wherein the memory device further comprises instructions stored therein, which when executed by the processing circuitry, configure the processing circuitry to provide feedback to the machine learning model to inform the machine learning model of the user's response to the outputted response and to update the machine learning model to reflect at least one of the user's response determined from the user state information and user feedback ratings.

14. The personal virtual assistant system of claim 1, wherein the memory device further comprises instructions stored therein, which when executed by the processing circuitry, repeat the receive, determine, generate, output, receive, and train steps to adjust feature weights to train the machine learning model to adjust content and delivery of the generated responses so that future generated responses are personalized to the user and adapted to improve the user's determined emotional state overtime.

15. The personal virtual assistant system of claim 1, wherein the memory device further comprises instructions stored therein, which when executed by the processing circuitry, configure the processing circuitry to cause the machine learning model to generate responses expected to elicit the particular reaction from the user based on the emotional state of the user.

16. The personal virtual assistant system of claim 1, wherein the memory device further includes instructions stored therein, which when executed by the processing circuitry, configure the processing circuitry to match the user against other users using demographic profiles, location, interests, or a combination thereof and to provide additional data to the machine learning model from at least one of the other users having a demographic profile, location, interests, or a combination thereof similar to that of the user.

17. The personal virtual assistant system of claim 1, wherein the memory device further includes instructions stored therein, which when executed by the processing circuitry, configure the processing circuitry to determine what information may be shared with the user based on the determined emotional state of the user and what information may be shared with the user at a later time when the user is determined to be in a different emotional state.

18. The personal virtual assistant system of claim 1, wherein the memory device further includes instructions stored therein, which when executed by the processing circuitry, configure the processing circuitry to learn a pattern of the emotional state of the user over time, to provide the pattern of the emotional state as input to the machine learning model, and to predict an emotional state of the user when a particular event or environmental condition is detected by the at least one sensing device.

19. A non-transitory machine readable medium that stores instructions thereon that when executed by one or more processing devices cause the one or more processing devices to implement a method of providing empathetic responses from a personal virtual assistant system, comprising:
  receiving a communication from a user that elicits a response from the personal virtual assistant system;
  sensing at least the user's voice;
  collecting user state information relating to an emotional state of the user from at least the user's voice;
  determining from at least the collected user state information an emotional state of the user using a machine learning model;
  selecting an emotional response comprising a generated response having selected language and a delivery method comprising at least one of volume and tone for the language of the generated response, the emotional response selected to change the determined emotional state of the user to a different emotional state;
  outputting the emotional response to the user using the delivery method;
  determining a user reaction to the emotional response;
  storing a tuple comprising a current situation, the emotional response, and the user reaction in a tuple data store; and
  training the machine learning model based on the tuple data store to learn a mapping between situations and emotional reactions for the user to emotional responses.

20. A method comprising:
  receiving communications from a user that elicit responses from a personal virtual assistant system;
  providing responses to the communications from the user;
  sensing at least the user's voice during at least one of the communications;
  collecting user state information relating to an emotional state of the user from at least the user's voice during the at least one of the communications;
  during the communications, determining from at least the collected user state information emotional states of the user using a machine learning model at different times during the communications;
  tracking an emotional state of the user during the communications using the user state information;
  using a difference in emotional state during the communications as a label for at least one response to the communications provided to the user; and
  adjusting feature weights to adapt a machine learning model using the label to personalize the machine learning model to the user whereby content and delivery of generated responses to the user are personalized to the user and adapted to improve the user's determined emotional state over time.

21. The non-transitory machine readable medium of claim 19, further comprising:
  sensing the user's tone of voice and language used in communicating with the personal virtual assistant system; and
  wherein collecting user state information relating to the emotional state of the user is further based upon one or more of the user's tone of voice, and the language used in communicating with the personal assistant system.

22. The non-transitory machine readable medium of claim 19, further comprising:
  sensing the user's facial expression; and
  wherein collecting user state information relating to the emotional state of the user is further based upon an emotional state of the user extracted from the user's facial expression.

23. The non-transitory machine readable medium of claim 19, further comprising:
  sensing the user's context from at least one of the user's location, local time, schedule, and surroundings and the user's prior interactions with the personal virtual assistant system or other devices; and
  wherein collecting user state information related to the emotional state of the user is further based upon the user's context.

24. The non-transitory machine readable medium of claim 19, wherein the delivery method further comprises at least one of a speed and language for the generated response.

25. The non-transitory machine readable medium of claim 19, further comprising creating a visual output comprising at least one of modified visual colors and animations in the response to the user depending upon the determined emotional state of the user.

26. The method of claim 20, further comprising:
  sensing the user's tone of voice and language used in communicating with the personal virtual assistant system; and
  wherein collecting user state information relating to the emotional state of the user is further based upon one or more of the user's tone of voice, and the language used in communicating with the personal assistant system.

27. The method of claim 20, further comprising:
  sensing the user's facial expression; and
  wherein collecting user state information relating to the emotional state of the user is further based upon an emotional state of the user extracted from the user's facial expression.

28. The method of claim 20, further comprising:
  sensing the user's context from at least one of the user's location, local time, schedule, and surroundings and the user's prior interactions with the personal virtual assistant system or other devices; and
  wherein collecting user state information related to the emotional state of the user is further based upon the user's context.

29. The method of claim 20, wherein the at least one response comprises a visual output comprising at least one of modified visual colors and animations based upon the emotional state of the user.

* * * * *